United States Patent
Ogasawara et al.

[11] Patent Number: 5,303,584
[45] Date of Patent: Apr. 19, 1994

[54] INTAKE AIR FLOW RATE MEASURING APPARATUS FOR INTERNAL COMBUSTION ENGINE, HAVING WATER-ABSORPTIVE POROUS PROTECTIVE MEMBER

[75] Inventors: Takayuki Ogasawara; Toru Kikuchi, both of Nagoya, Japan

[73] Assignee: NGK Insulators, Ltd., Japan

[21] Appl. No.: 992,921

[22] Filed: Dec. 18, 1992

[30] Foreign Application Priority Data

Dec. 24, 1991 [JP] Japan .................. 3-356935

[51] Int. Cl.⁵ .............................. G01F 1/68
[52] U.S. Cl. .................. 73/204.21; 73/118.2; 73/198
[58] Field of Search .......... 73/118.2, 198, 204.21, 73/204.22

[56] References Cited

U.S. PATENT DOCUMENTS

| | | | |
|---|---|---|---|
| 3,433,069 | 3/1969 | Trageser | 73/204.21 |
| 4,210,016 | 7/1980 | Peter et al. | 73/118.2 |
| 5,014,552 | 5/1991 | Kamiunten et al. | 73/204.21 |

FOREIGN PATENT DOCUMENTS 54-74779 6/1979 Japan .
63-243720 10/1988 Japan .
1-102722 7/1989 Japan .
1-169323 7/1989 Japan .
1-45009 10/1989 Japan .

OTHER PUBLICATIONS

Ueno et al., "Anti-Dirt Property of Hot-Wire Air Flow Meter", 1983, Society of Automotive Engineers, Inc., pp. 1–12.

*Primary Examiner*—Herbert Goldstein
*Attorney, Agent, or Firm*—Parkhurst, Wendel & Rossi

[57] ABSTRACT

An apparatus for measuring the flow rate of an intake air flowing through an air passage which communicates with an internal combustion engine is disclosed. The apparatus includes a heat-generating resistor element disposed in the air passage for detecting the flow rate of the intake air in the air passage, and at least one protective member disposed on upstream and/or downstream side(s) of the heat-generating resistor element as viewed in an air flow direction in which the intake air flows through the air passage, so as to extend in a direction perpendicular to the air flow direction. The protective member(s) is/are formed of a water-absorptive porous material, and have a plurality of holes formed through the thickness thereof in the air flow direction.

7 Claims, 4 Drawing Sheets

INTAKE AIR FLOW RATE MEASURING APPARATUS FOR INTERNAL COMBUSTION ENGINE, HAVING WATER-ABSORPTIVE POROUS PROTECTIVE MEMBER

BACKGROUND OF THE INVENTION

1. Field of the Invention

The present invention relates in general to a apparatus for measuring the flow rate of intake air in an intake air passage of an internal combustion engine, which apparatus includes a heat-generating resistor element in the form of a hot wire or a hot film, for example, and more particularly to such an measuring apparatus wherein the heat-generating resistor element is effectively protected against dust in the intake air, and/or water, oil and other contaminants in the back fire from the engine.

2. Discussion of the Prior Art

As known in the art, various types of air flow meters are disposed in an intake air passage of an internal combustion engine, to detect the flow rate of intake air supplied to the engine. As one type of such air flow meters, there is known a thermal flowmeter as disclosed in JP-B2-1-45009, which includes a heat-generating resistor element in the form of a hot wire, hot film and the like, which is disposed in an intake air passage. The disclosed thermal flowmeter is adapted to determine the flow rate of the intake air, by detecting a change in the electrical resistance of the resistor element, which varies with the amount of heat transfer from the element to the air flowing through the passage.

In the thermal flowmeter thus installed in the intake air passage of the internal combustion engine, the surface of the heat-generating resistor element may be contaminated by dust contained in the intake air, or water, oil and others contained in the backfire blowing back from the engine, whereby the thermal conductivity of the resistor element and consequently the output characteristics of the element are changed. As a result, there arises a deviation of the output of the resistor element from the actual flow rate of the intake air. This deviation gradually increases with an increase in the amount of the contaminants attached to the resistor element, with a result of chronological reduction in the detecting accuracy of the flowmeter.

In view of the above, it has been proposed to provide a protective member or members of various mesh structures, which is/are located upstream and/or downstream of the heat-generating resistor element disposed in the intake air passage, so as to capture dust, water, oil and other contaminants which would otherwise be attached to the resistor element.

Some examples of such protective member are disclosed in JP-A-54-74779, which have various kinds of mesh structures such as a sieve mesh, honeycomb mesh, and a mesh consisting of a bundle of tubes. Another form of protective member is disclosed in JP-A-63-243720, which is a network or honeycomb metal structure having good electric conductivity, adapted for removing an electrostatic charge from dust which passes through the structure. It is also proposed in JP-A-1-169323 to heat a mesh-like member for capturing dust in the intake air, to thereby enhance its capability of capturing the dust. A further form of protective member as disclosed in JP-U-1-102722 is a net which is located in the vicinity of a heat-generating resistor element on the upstream side thereof as viewed in a direction in which the intake air flows. This net is adapted to cause a slight turbulence of the air passing therethrough, so as to give a rotating force to dust passing through the net and thereby prevent the dust from attaching to the resistor element.

However, the protective members as described above are all formed from a metal sheet, a metal wire and the like having a relatively smooth surface, to which dust, water, oil and other contaminants are less likely to be attached. Thus, the known protective members suffer from low capability of capturing the contaminants. Further, the dust, water, oil and others once attached to the protective member are likely to be removed from the member, and eventually pass through the protective member and are attached to the heat-generating resistor element. Thus, the amount of the contaminants attached to the resistor element cannot be effectively reduced by the known protective members.

SUMMARY OF THE INVENTION

It is therefore an object of the present invention to provide an apparatus for measuring the flow rate of an intake air supplied to an internal combustion engine, including a protective member which has enhanced capability of capturing contaminants, and which prevents dust in the intake air and/or water, oil and others in the back fire from passing therethrough and attaching to a heat-generating resistor element.

The above object may be achieved according to the principle of the present invention, which provides an apparatus for measuring the flow rate of an intake air flowing through an air passage into an internal combustion engine, comprising: a heat-generating resistor element disposed in the air passage for detecting the flow rate of the intake air in the air passage; and at least one protective member disposed on at least one of upstream and downstream sides of the heat-generating resistor element as viewed in an air flow direction in which the intake air flows through the air passage, so as to extend in a direction perpendicular to the air flow direction, the above-indicated at least one protective member being formed of a water-absorptive porous material, each protective member having a plurality of holes formed through the thickness thereof in the air flow direction.

Since the protective member is formed of a water-absorptive porous material according to the present invention, there exist minute open pores or concaves and convexes on a surface of the protective member, to which water, oil and others in the backfire as well as dust in the intake air are likely to be attached. Further, the dust, water and oil once attached are less likely to be removed from the surface of the protective member. Thus, the protective member has significantly enhanced capability of capturing contaminants or impurities. Since the protective member substantially prevents passage of the dust, water, oil and other contaminants therethrough, and the amount of the contaminants attached to the heat-generating resistor element can be effectively reduced, the output characteristics of the resistor element remain unchanged, ensuring that the output of the element accurately represents the actual flow rate of the intake air. Thus, the detecting accuracy of the present measuring apparatus can be maintained at a high level for a prolonged time.

BRIEF DESCRIPTION OF THE DRAWINGS

The foregoing and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
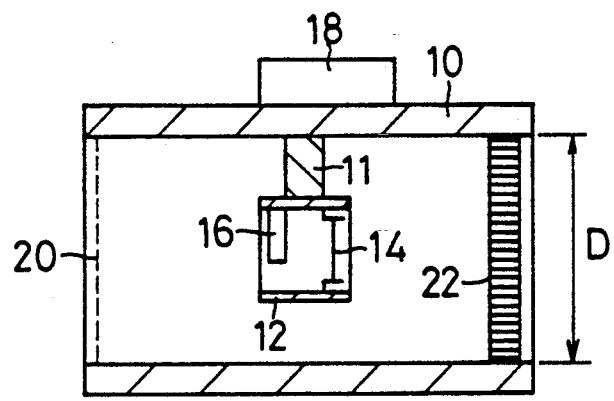
FIG. 1 is a schematic view in axial cross section of one embodiment of an intake air flow rate measuring apparatus of the present invention, adapted for use in an internal combustion engine of a motor vehicle.
Figure 2:
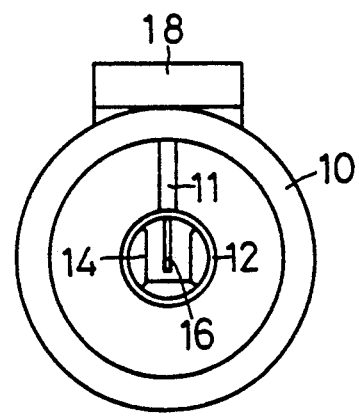
FIG. 2 is a front view of the measuring apparatus of FIG. 1 in the absence of a metal screen and a protective member.

Referring first to FIG. 1, there is schematically illustrated an apparatus for measuring the flow rate of an intake air as one embodiment of the present invention, which is used in an intake air passage of an internal combustion engine for a motor vehicle. In the figure, reference numeral 10 denotes a cylindrical connector which defines a part of the intake air passage through which the intake air flows, and which connects an air filter provided in the intake air passage with the vehicle engine. A sleeve 12 having a smaller diameter than the connector 10 is supported by a support 11 in the connector 10, such that these connectors and sleeve 10, 12 are disposed in concentric relation with each other, as shown in FIG. 2. In operation, the intake air flows through the connector 10, from the left-hand side to the right-hand side as viewed in FIG. 1.

Within the sleeve 12, there are provided a heat-generating resistor element 14 as a flow rate detecting portion, and a heat-sensitive resistor element 16. The heat-generating resistor element 14 consists of a hot wire as known in the art and serves to detect the flow rate of the intake air, while the heat-sensitive resistor element 16 serves to detect and compensate the temperature variation of the intake air. These resistor elements 14, 16 are connected to a control circuit 18 mounted on the outer circumferential surface of the connector 10, so that a controlled current is applied by the control circuit 18 to each of the resistor elements 14, 16 in the manner as known in the art. Generally, the construction of the heat-sensitive resistor element 16 is similar to that of the heat-generating resistor element 14, as well known in the art.

Figure 3:
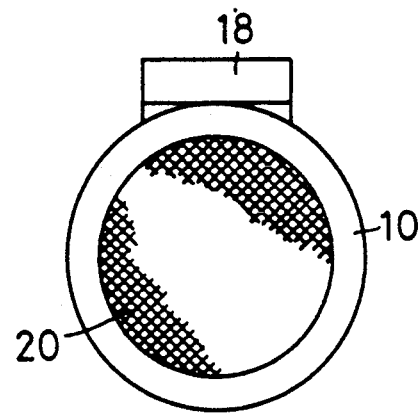
FIG. 3 is a front view of the measuring apparatus of FIG. 1.

A metal screen 20 as shown in FIG. 3 is provided at one of opposite axial ends of the connector 10 on its upstream side as viewed in the air flow direction in which the intake air flows, i.e., on the left-hand side as seen in FIG. 1. The metal screen 20 extends over the entire cross sectional area of a passage defined by the connector 10, in a direction perpendicular to the air flow direction. On the other hand, a generally disk-like protective member 22 is provided at the other axial end of the connector 10 on its downstream side as viewed in the air flow direction, i.e., on the right-hand side as seen in FIG. 1. The protective member 22 has a multiplicity of square through-holes or perforations 23 formed through the thickness thereof in the air flow direction. In this arrangement, the sleeve 12 is located between the metal screen 20 and protective member 22 within the connector 10, whereby the flow rate detecting portion (heat-generating resistor element 14) in the sleeve 12 is favorably protected against damages. In particular, the flow rate detecting portion is effectively shut off from the flame of the back fire blowing back from the engine, in the presence of the protective member 22 on the downstream side of the connector 10.

The protective member 22 is formed of a water-absorptive porous material, unlike the conventional counterpart. In this particular embodiment wherein the protective member 22 is provided on the downstream side of the connector 10, in other words, on the side which receives the backfire from the engine, the material for the protective member 22 is suitably selected from heat-resistant materials, such as alumina, cordierite and other ceramic materials, which are resistant to high-temperature heat of the backfire. The use of such ceramic materials makes it possible to produce a water-absorptive, porous protective member. In particular, the use of alumina having relatively high heat conductivity makes it possible to efficiently dissipate heat generated at the control circuit 18. The protective member 22 is produced in a known manner using such water-absorptive porous material, to desirably achieve the open porosity of 1% or more.

Since the protective member is formed of a water-absorptive porous material as described above, there exist minute open pores or concaves and convexes on a surface of the protective member, to which water, oil and others in the backfire are likely to be attached. Further, the water, oil and others once attached are less likely to be removed from the surface of the protective member. Thus, the protective member has significantly enhanced capability of capturing the contaminants. Namely, the backfire is efficiently purified while passing through the protective member 22, and therefore the amount of the water, oil and other contaminants attached to the heat-generating resistor element 14 can be effectively reduced. Consequently, the output characteristics of the resistor element 14 remain unchanged, and the detecting accuracy of the element 14 in detecting the air flow of the intake air can be maintained at a sufficiently high level for a prolonged time.

The size, shape, length, number and other parameters of the through-holes 23 formed through the protective member 22 are not particularly limited but may be suitably determined as desired. To enhance the capability of the protective member 22 in capturing dust in the intake air and water, oil and other contaminants in the backfire, however, the protective member 22 is preferably formed such that the number of the through-holes 23 is twenty or more per square inch, and such that the thickness of its walls defining the through-holes 23 is 0.05 mm or larger. It is also desirable that the ratio of the length L of the through-holes 23 to the maximum diameter D of the intake air passage (which is almost equal to the diameter d of the protective member 22 in the instant embodiment) is 0.05 or larger.

The porous protective member 22 used in the instant embodiment is formed of cordierite to achieve the porosity of 20%, and is dimensioned such that its diameter d is 80 mm, and the thickness of the walls defining the through-holes 23 is 0.2 mm. This protective member 22 has 50 through-holes per square inch, which are principally shaped to have a square cross section and have a length L of 5 mm.

In the instant embodiment, the metal screen 20 rather than the protective member 22 is provided at the upstream end of the connector 10, since a relatively pure air which has passed the air filter flows into the passage defined by the connector 10. However, the protective member 22 may be also provided at the upstream end of the connector 10 so as to effectively remove dust and others contained in the intake air, thereby preventing the dust and others in the intake air from attaching to the heat-generating resistor element 14.

Figure 5:
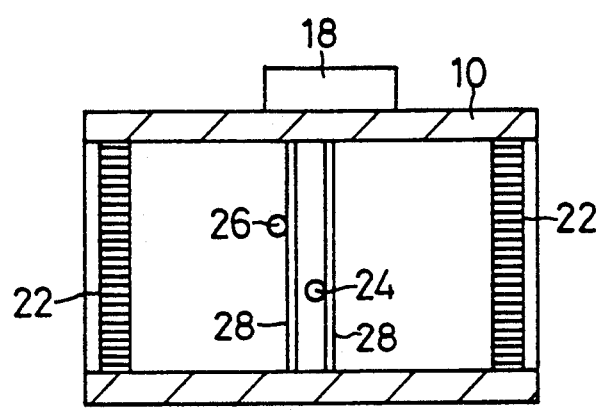
FIG. 5 is a schematic view in axial cross section of another embodiment of the intake air flow rate measuring apparatus of the present invention.
Figure 6:
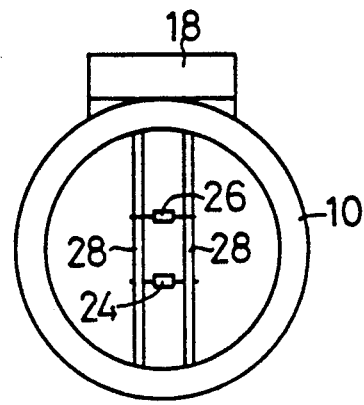
FIG. 6 is a front view of the measuring apparatus of FIG. 5 in the absence of protective members.

Referring next to FIGS. 5 and 6, there will be described another embodiment of the intake air flow measuring apparatus of the present invention adapted for use in an internal combustion engine. In this measuring apparatus, a plurality of posts 28 are disposed in parallel with each other in the connector 10, to support a heat-generating resistor element 24 as a flow rate detecting portion, and a heat-sensitive resistor element 26 for compensating the temperature variation of the intake air. Each of the resistor elements 24, 26 is welded to two of the posts 28 which are aligned with each other as viewed in the axial direction of the connector 10 such that the element 24, 26 crosses over the two posts 28. The heat-generating resistor element 24 may be constructed such that a platinum thin film as a resistor body is formed on the outer circumferential surface of an alumina tube as a substrate. The heat-sensitive resistor element 26 may have a similar structure. A controlled electric current is applied by the control circuit 18 to each of the resistor elements 24, 26 through the posts 28.

Figures 4A, 4B:
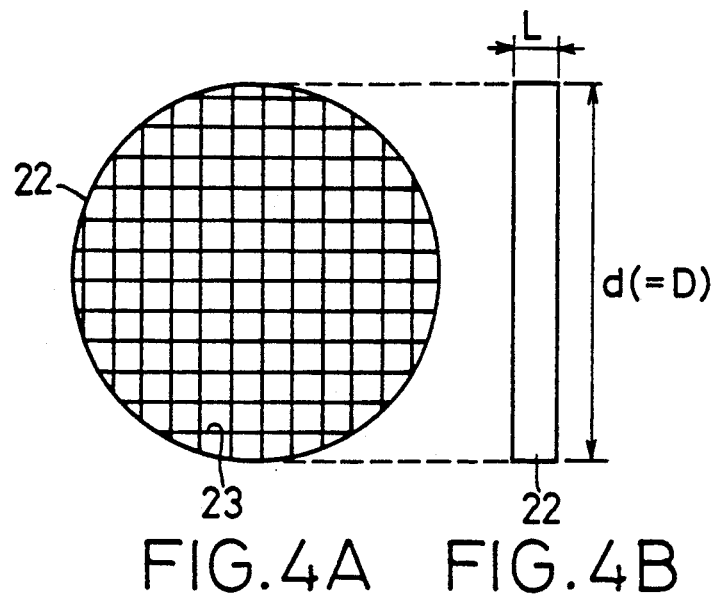
FIGS. 4A and 4B are front and side views of the protective member used in the measuring apparatus of FIG. 1.

At the upstream and downstream ends of the connector 10, there are disposed respective protective members 22, 22 made of a water-absorptive porous material and constructed as shown in FIGS. 4A and 4B. In this case, the heat-generating and heat-sensitive resistor elements 24, 26 are disposed between these two protective members 22, 22. In this embodiment, the upstream-side protective member 22 serve to capture dust and others contained in the intake air, while the downstream-side protective member 22 serves to capture water, oil and others contained in the backfire. Accordingly, the heat-generating resistor element 24 as the flow rate detecting portion is effectively protected against such contaminants, that is, the amount of the contaminants attached to the element 24 can be effectively reduced. Consequently, the output characteristics of the heat-generating resistor element 24 remain unchanged, and the flow rate of the intake air can be detected with high accuracy for a prolonged time.

To further reduce the amount of the dust, water, oil and other contaminants attached to the heat-generating resistor element 24, two or more protective members 22 may be provided on at least one of the upstream and downstream sides of the resistor element 24, such that the protective members 22 on either side are spaced from each other at a suitable interval in the air flow direction in which the intake air flows.

Figure 7:
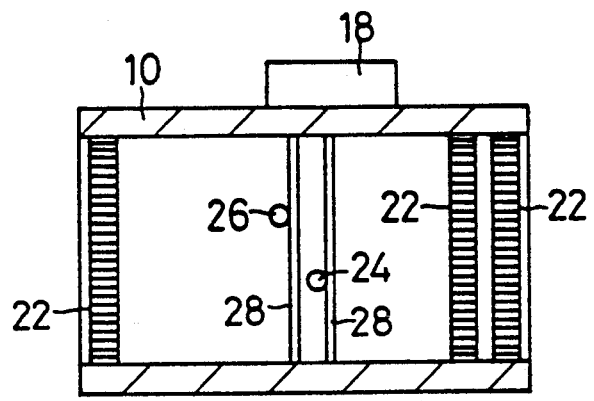
FIG. 7 is a cross sectional view corresponding to that of FIG. 5, of the measuring apparatus having one protective member on the upstream side and two protective members on the downstream side of a heat-generating resistor element.
Figure 8:
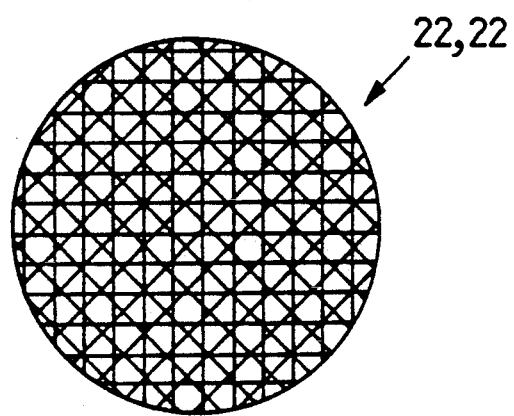
FIG. 8 is a view showing cross sectional images of the two protective members of the apparatus of FIG. 7, which are disposed on the downstream side of the resistor element.

An example is illustrated in FIG. 7, in which two protective members 22, 22 constructed as shown in FIG. 4 are disposed on the downstream side of the heat-generating resistor element 24 (on the right-hand side as seen in FIG. 7), such that the protective members 22, 22 are spaced 5 mm from each other. In such case where two or more protective members are disposed with a suitable spacing therebetween, it is desirable to orient the protective members 22 with respect to each other such that the walls of one of the members 22 defining the through-holes are not aligned with those of the other member 22 as viewed in the direction perpendicular to the plane of the protective members 22, i.e., in the air flow direction, as shown in FIG. 8. This makes it possible to use protective members 22 with a small number of through-holes having a relatively large size, for effectively capturing dust, water, oil and other contaminants, since the members 22 thus arranged and oriented cooperate to provide a large number of through-holes having a reduced size.

Figure 9:
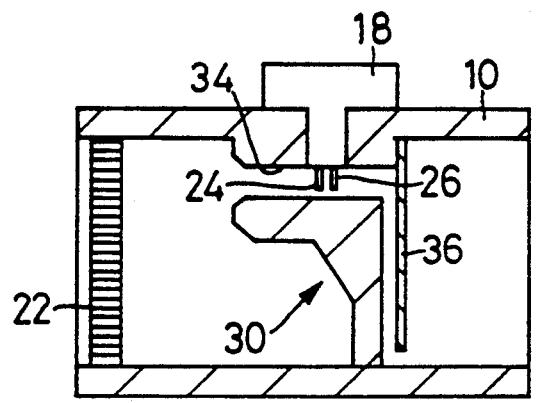
FIG. 9 is a schematic view in axial cross section of a further embodiment of the intake air flow rate measuring apparatus of the present invention.
Figure 10:
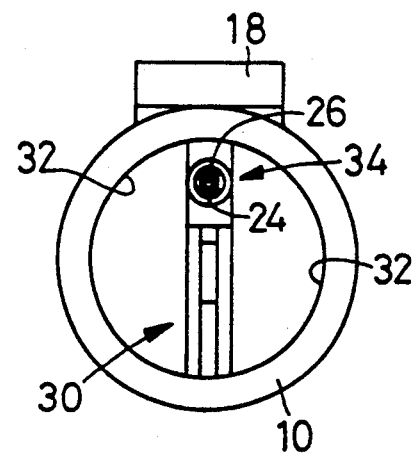
FIG. 10 is a front view of the measuring apparatus of FIG. 9 in the absence of a protective member.

Referring next to FIGS. 9 and 10, there will be described a further embodiment of the intake air flow measuring apparatus of the present invention, adapted for use in an internal combustion engine. In this measuring apparatus, a partition 30 is provided within the connector 10 so as to divide the space in the connector 10 into two main passages 32 which extend in the air flow direction on the opposite sides of the partition 30. The partition 30 has a bypass passage 34 formed therethrough, in which are mounted the heat-generating resistor element 24 serving as a flow rate detecting portion, and the heat-sensitive resistor element 26 serving to compensate the temperature variation of the intake air. These resistor elements 24, 26 are energized by an electric current and thus suitably controlled by the control circuit 18. The measuring apparatus further includes a cover plate 36 having the same width as the partition 30 and disposed on the downstream side of the bypass passage 34 as viewed in the air flow direction (i.e., the right-hand side as seen in FIG. 9). This cover plate 36 is opposed to the downstream-side opening of the bypass passage 34, and functions to prevent the backfire from directly flowing into the bypass passage 34.

The protective member 22 made of water-absorptive porous material and constructed as shown in FIG. 4 is provided at one of opposite axial ends of the connector 10 on its upstream side as viewed in the air flow direction, i.e., on the left-hand side as seen in FIG. 9. Accordingly, the heat-generating and heat-sensitive resistor elements 24, 26 are disposed between the protective member 22 and cover plate 36.

In the thus constructed measuring apparatus, the protective member 22 functions to capture dust and the like in the intake air, while the cover plate 36 prevents the backfire from blowing into the bypass passage 34, thereby effectively avoiding attachment of the dust in the intake air, and water, oil and others in the backfire to the heat-generating resistor element 24 as the flow rate detecting portion. Thus, the instant embodiment yields the same effects as provided in the above two embodiments.

While the present invention has been described in detail in its presently preferred embodiments, for illustrative purpose only, it is to be understood that the present invention may be embodied with various changes, modifications and improvements which may occur to those skilled in the art, without departing from the spirit and scope of the invention.

What is claimed is:

1. An apparatus for measuring the flow rate of an intake air flowing through an air passage which communicates with an internal combustion engine, comprising:

a heat-generating resistor element disposed in said air passage for detecting the flow rate of the intake air in the air passage; and at least one protective member disposed on at least one of upstream and downstream sides of said heat-generating resistor element as viewed in an air flow direction in which the intake air flows through the air passage, so as to extend in a direction perpendicular to said air flow direction, said at least one protective member being formed of a water-absorptive porous material, each of said at least one protective member having a plurality of holes formed through the thickness thereof in said air flow direction.

2. An apparatus according to claim 1, wherein said water-absorptive porous material of said at least one protective member has an open porosity of at least 1%.

3. An apparatus according to claim 1, wherein said water-absorptive porous material of said at least one protective member is a ceramic material selected from the group consisting of alumina and cordierite.

4. An apparatus according to claim 1, wherein each of said at least one protective member has at least twenty holes per square inch as said plurality of holes, and has walls defining said holes and having a thickness of at least 0.05 mm.

5. An apparatus according to claim 1, wherein the ratio (L/D) of a length (L) of said plurality of holes of said each protective member to the maximum diameter (D) of said air passage is at least 0.05.

6. An apparatus according to claim 1, wherein said at least one protective member includes at least two protective members provided on at least one of upstream and downstream sides of said heat-generating resistor element, said at least two protective members being spaced from each other in said air flow direction.

7. An apparatus according to claim 6, wherein said at least two protective members are oriented such that one of said at least two protective members has walls defining said holes, which walls are not aligned with walls of the other of said at least two protective members as viewed in said first direction.

* * * * *